United States Patent
Blair et al.

(10) Patent No.: US 8,072,901 B1
(45) Date of Patent: Dec. 6, 2011

(54) TECHNIQUE FOR EFFICIENT PROBING TO VERIFY POLICY CONFORMANCE

(75) Inventors: Dana Blair, Alpharetta, GA (US); Larry R. Metzger, Wake Forest, NC (US)

(73) Assignee: Cisco Technology, Inc., San Jose, CA (US)

( * ) Notice: Subject to any disclaimer, the term of this patent is extended or adjusted under 35 U.S.C. 154(b) by 894 days.

(21) Appl. No.: 11/239,595

(22) Filed: Sep. 29, 2005

Related U.S. Application Data

(60) Provisional application No. 60/679,184, filed on May 9, 2005.

(51) Int. Cl.
*H04L 12/28* (2006.01)

(52) U.S. Cl. .......................... 370/254; 709/239

(58) Field of Classification Search .................. 370/400, 370/401, 402, 403, 404, 405, 229–240, 254–258, 370/351
See application file for complete search history.

(56) References Cited

U.S. PATENT DOCUMENTS

| | | | | |
|---|---|---|---|---|
| 4,538,152 | A * | 8/1985 | Wirth | 342/158 |
| 5,781,534 | A * | 7/1998 | Perlman et al. | 370/248 |
| 6,075,769 | A * | 6/2000 | Ghanwani et al. | 370/229 |
| 6,275,470 | B1 * | 8/2001 | Ricciulli | 370/238 |
| 6,292,832 | B1 | 9/2001 | Shah et al. | |
| 6,324,656 | B1 | 11/2001 | Gleichauf et al. | |
| 6,363,056 | B1 * | 3/2002 | Beigi et al. | 370/252 |
| 6,400,681 | B1 * | 6/2002 | Bertin et al. | 370/218 |
| 6,400,686 | B1 * | 6/2002 | Ghanwani et al. | 370/232 |
| 6,446,121 | B1 | 9/2002 | Shah et al. | |
| 6,470,073 | B1 | 10/2002 | Fish et al. | |
| 6,600,724 | B1 | 7/2003 | Cheng | |
| 6,711,137 | B1 * | 3/2004 | Klassen et al. | 370/252 |
| 6,717,920 | B1 | 4/2004 | Cheng | |
| 6,775,280 | B1 | 8/2004 | Ma et al. | |
| 6,804,532 | B1 * | 10/2004 | Moon et al. | 455/552.1 |
| 6,804,712 | B1 | 10/2004 | Kracht | |
| 6,836,465 | B2 * | 12/2004 | Rajan et al. | 370/238 |
| 6,868,068 | B1 | 3/2005 | Jain et al. | |
| 6,868,094 | B1 | 3/2005 | Bordonaro et al. | |
| 6,912,200 | B2 * | 6/2005 | Halme | 370/238 |
| 7,099,284 | B2 * | 8/2006 | Halme | 370/253 |
| 7,133,365 | B2 * | 11/2006 | Klinker et al. | 370/238 |
| 7,139,242 | B2 * | 11/2006 | Bays | 370/238 |
| 7,222,190 | B2 * | 5/2007 | Klinker et al. | 709/238 |

(Continued)

OTHER PUBLICATIONS

U.S. Appl. No. 60/679,184, filed May 9, 2005, entitled Systems and Methods for Use With Optimized Edge Routing, by Blair et al.

(Continued)

*Primary Examiner* — Ricky Ngo
*Assistant Examiner* — Ben Liu
(74) *Attorney, Agent, or Firm* — Cesari and McKenna, LLP

(57) ABSTRACT

A technique efficiently sends probe packets from a source to a target in a destination prefix over two or more paths of a computer network. According to the novel technique, the source, e.g., configured for optimized edge routing (OER), sends probe packets (probes) over all available paths (exits) to the target in the destination prefix in order to select a preferred path based on received responses to the probes, e.g., according to one or more policies. Once the preferred path is selected, the source sends probes to that target only over the preferred path until a trigger occurs, such as, e.g., an out of policy (OOP) event, a policy change, or an optional timer-based trigger. Upon being triggered, the source again probes all paths to reselect the preferred path.

21 Claims, 5 Drawing Sheets

U.S. PATENT DOCUMENTS

| | | | | |
|---|---|---|---|---|
| 7,257,081 | B2* | 8/2007 | Rajan et al. | 370/231 |
| 7,260,645 | B2* | 8/2007 | Bays | 709/238 |
| 7,269,157 | B2* | 9/2007 | Klinker et al. | 370/351 |
| 7,292,540 | B2* | 11/2007 | Yada et al. | 370/253 |
| 7,305,464 | B2* | 12/2007 | Phillipi et al. | 709/223 |
| 7,330,435 | B2* | 2/2008 | Guerin et al. | 370/238 |
| 7,330,436 | B2* | 2/2008 | Fabre et al. | 370/238.1 |
| 7,447,239 | B2* | 11/2008 | Carson et al. | 370/509 |
| 7,467,224 | B2* | 12/2008 | Chandrayana et al. | 709/238 |
| 7,472,314 | B2* | 12/2008 | Bejerano et al. | 714/47 |
| 7,525,920 | B2* | 4/2009 | Guerin et al. | 370/238 |
| 7,532,631 | B2* | 5/2009 | Raszuk et al. | 370/401 |
| 7,561,517 | B2* | 7/2009 | Klinker et al. | 370/235 |
| 7,581,022 | B1* | 8/2009 | Griffin et al. | 709/238 |
| 7,584,298 | B2* | 9/2009 | Klinker et al. | 709/238 |
| 7,609,619 | B2* | 10/2009 | Naseh et al. | 370/225 |
| 7,619,982 | B2* | 11/2009 | Blair et al. | 370/248 |
| 7,668,966 | B2* | 2/2010 | Klinker et al. | 709/232 |
| 7,675,861 | B2* | 3/2010 | Metzger et al. | 370/241 |
| 7,720,054 | B2* | 5/2010 | Savage et al. | 370/389 |
| 2002/0078223 | A1* | 6/2002 | Baldonado et al. | 709/232 |
| 2002/0105911 | A1* | 8/2002 | Pruthi et al. | 370/241 |
| 2003/0147386 | A1 | 8/2003 | Zhang et al. | |
| 2004/0042396 | A1* | 3/2004 | Brown et al. | 370/227 |
| 2005/0081082 | A1* | 4/2005 | Brodie et al. | 714/4 |
| 2006/0182034 | A1* | 8/2006 | Klinker et al. | 370/238 |
| 2006/0215577 | A1* | 9/2006 | Guichard et al. | 370/254 |
| 2007/0263553 | A1* | 11/2007 | Bharali et al. | 370/254 |

OTHER PUBLICATIONS

U.S. Appl. No. 11/113,629, filed Apr. 25, 2005, entitled Active Probe Path Management, by Blair et al.

U.S. Appl. No. 11/113,582, filed Apr. 25, 2005, entitled Active Probe Target Management, by Metzger et al.

Perlman, Radia, "Interconnections Second Edition: Bridges, Routers, Switches, and Internetworking Protocols", Sections 12.1-12.3 pp. 299-324, Addison Wesley Longman, Inc. 2000.

Rekhter, Y. et al., RFC 1771, "A Border Gateway Protocol 4 (BGP-4)", Network Working Group, Mar. 1995, pp. 1-54.

Postel, J., RFC 792, entitled Internet Control Message Protocol: DARPA Internet Program Protocol Specifiation, Sep. 1981, pp. 1-21.

Postel, J., RFC 862, entitled Echo Protocol, May 1983, p. 1.

Jacobson, V., et al., RFC 1072, entitled TCP Extenstions for Long-Delay Paths, Oct. 1988, pp. 1-15.

"NetFlow Services Solutions Guide", Oct. 2004, pp. 1-71, Cisco Systems, Inc.

U.S. Appl. No. 10/980,550, filed Nov. 3, 2004, entitled Method and Apparatus for Automatically Optimizing Routing Operations at the Edge of a Network, by Shah et al.

\* cited by examiner

TECHNIQUE FOR EFFICIENT PROBING TO VERIFY POLICY CONFORMANCE

RELATED APPLICATIONS

This application claims the benefit of U.S. Provisional Application Ser. No. 60/679,184, entitled SYSTEMS AND METHODS FOR USE WITH OPTIMIZED EDGE ROUTING, filed by Blair et al. on May 9, 2005, the contents of which are hereby incorporated in its entirety.

This application is also related to U.S. patent application Ser. No. 11/113,629, entitled ACTIVE PROBE PATH MANAGEMENT, filed by Blair et al. on Apr. 25, 2005, and commonly owned copending U.S. patent application Ser. No. 11/113,582, entitled ACTIVE PROBE TARGET MANAGEMENT, filed by Metzger et al. on Apr. 25, 2005, the contents of both of which are hereby incorporated in their entirety.

BACKGROUND OF THE INVENTION

1. Field of the Invention

The present invention relates to computer networks and more particularly to managing probe packets transferred in a computer network.

2. Background Information

A computer network is a geographically distributed collection of nodes interconnected by communication links and segments for transporting data between end nodes, such as personal computers and workstations ("hosts"). Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled is together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS or an area is generally referred to as a "domain," and a node that interconnects different domains together is generally referred to as a "border node or border router." In general, the autonomous system may be an enterprise network, a service provider or any other network or subnetwork. Furthermore, the autonomous system may be multi-homed, i.e., comprising a plurality of different peer (neighboring) connections to one or more other routing domains or autonomous systems.

The administrative entity of an AS typically configures network nodes within the AS to route packets using predetermined intradomain routing protocols, or interior gateway protocols (IGPs), such as conventional link-state protocols and distance-vector protocols. These IGPs define the manner with which routing information and networktopology information is exchanged and processed in the AS. Examples of link-state and distance-vectors protocols known in the art are described in Sections 12.1-12.3 of the reference book entitled *Interconnections, Second Edition*, by Radia Perlman, published January 2000, which is hereby incorporated by reference as though fully set forth herein.

Link-state protocols, such as the Open Shortest Path First (OSPF) protocol, use cost-based routing metrics to determine how data packets are routed in an AS. As understood in the art, a relative cost value may be associated with a network node to determine the relative ease/burden of communicating with that node. For instance, the cost value may be measured in terms of the average time for a data packet to reach the node, the amount of available bandwidth over a communication link coupled to the node, the monetary cost per amount of bandwidth, etc. Network nodes in the AS generate a set of cost values associated with their neighboring nodes. Each set of cost values is then "advertised" (flooded) to the other interconnected nodes. Using the advertised cost values, each node can generate a consistent "view" of the network topology, thereby enabling the nodes to determine lowest-cost routes within the AS.

Distance-vector protocols, such as the Interior Gateway Routing Protocol (IGRP) or Routing Information Protocol (RIP), use distance-based routing metrics to determine how data packets are routed in an AS. A network node may associate a distance metric with each of its interconnected nodes in the AS. For example, the distance metric may be based on, e.g., a number of hops between a pair of nodes or an actual distance separating the nodes. Operationally, the network nodes determine distances to reachable nodes in the AS and communicate these distance metrics to their neighboring nodes. Each neighboring node augments the received set of distance metrics with its own distance measurements and forwards the augmented set of metrics to its neighbors. This process is continued until each node receives a consistent view of the network topology.

A plurality of interconnected ASes may be configured to exchange routing and reachability information among neighboring interdomain routers of the systems in accordance with a predetermined external gateway protocol, such as the Border Gateway Protocol (BGP). The BGP protocol is well known and generally described in Request for Comments (RFC) 1771, entitled *A Border Gateway Protocol 4 (BGP-4)*, published March 1995, which is hereby incorporated by reference in its entirety. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. The BGP protocol facilitates policy-based routing in which an administrative entity places restrictions on inter-AS routing operations. For example, the administrator of a company's AS may employ a routing policy where network traffic leaving the AS is not permitted to enter a competitor's network, even if the competitor provides an otherwise acceptable routing path. To implement the BGP protocol, each AS includes at least one border node through which it communicates with other, interconnected ASes. Because data packets enter and exit the AS through the border node, the border node is said to be located at the "edge" of the AS.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

In some networks, border nodes located at edges of ASes, e.g., between an enterprise network and one or more Internet Service Providers (ISPs), may be configured as Optimized Edge Routers (OERs). Here each OER may be configured to periodically select an Optimal Exit Link (OEL) to each ISP for a given destination prefix (a monitored prefix) based on performance, load, cost, and service level agreements (SLAs) associated with connections to the ISP. Ultimately, the end result for the enterprise network is improved Internet performance, better load distribution, and/or lower costs for Internet connections. Techniques that may be used to select the OEL for the monitored prefix include passive monitoring and/or active probing. Passive monitoring relies on gathering information from OERs learned from monitoring conventional user traffic, such as throughput, timing, latency, packet loss, reachability, etc. Active probing, on the other hand, relies on probe packets to measure various parameters associated with accessing the monitored prefix from an originating node (source). Here, the originating node may generate multiple probe packets that are then forwarded via different exits (e.g., data links) on different paths to target nodes (targets) in the monitored (destination) prefix. Upon receiving the probe packets, the targets respond to the originating node, e.g., with return packets or other known probe responses. The originating node may eventually acquire the responses and use them to measure various parameters, such as delay, loss, jitter, and reachability, etc., associated with accessing the destination prefix via the different links. The originating node may then use the parametric (performance) information (i.e., learned from passive monitoring or active probing) to select an OEL from among the different exits that may be used to reach the destination prefix.

In a typical network, however, there are often multiple paths that may be available to reach a particular destination prefix. Active probing generally probes all available paths in order to determine the parametric information, thereby allowing the OERs to select one or more preferred paths from the set of all paths (e.g., according to a specified policy). Actively probing all available paths all the time to determine the best path requires significant resources on the probe source (router), the target and, generally, the network. As those skilled in the art will understand, the network is more likely to filter probe responses during the probing of all paths, while the probing may actually create congestion that impacts the quality of each probe packet and response.

SUMMARY OF THE INVENTION

The present invention is directed to a technique for efficiently sending probe packets from a source to a target in a destination prefix over two or more paths of a computer network. According to the novel technique, the source, e.g., configured for optimized edge routing (OER), sends probe packets (probes) over all available paths (exits) to the target in the destination prefix in order to select a preferred path based on received responses to the probes, e.g., according to one or more policies. Once the preferred path is selected, the source sends probes to that target only over the preferred path until a trigger occurs, such as, e.g., an out of policy (OOP) event, a policy change, or an optional timer-based trigger. Upon being triggered, the source again probes all paths to reselect the preferred path.

Advantageously, the novel technique efficiently sends probe packets from a source to a destination over two or more paths of a computer network. By controlling the number of paths to receive probes, thus limiting the number of probes sent, the novel technique minimizes the total resource allocation of the source, target, and network (e.g., memory, processing, bandwidth, etc.). Also, by only sending probes over the preferred path during steady state (no triggers), the likelihood of responses and the quality (accuracy) of the responses are increased.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
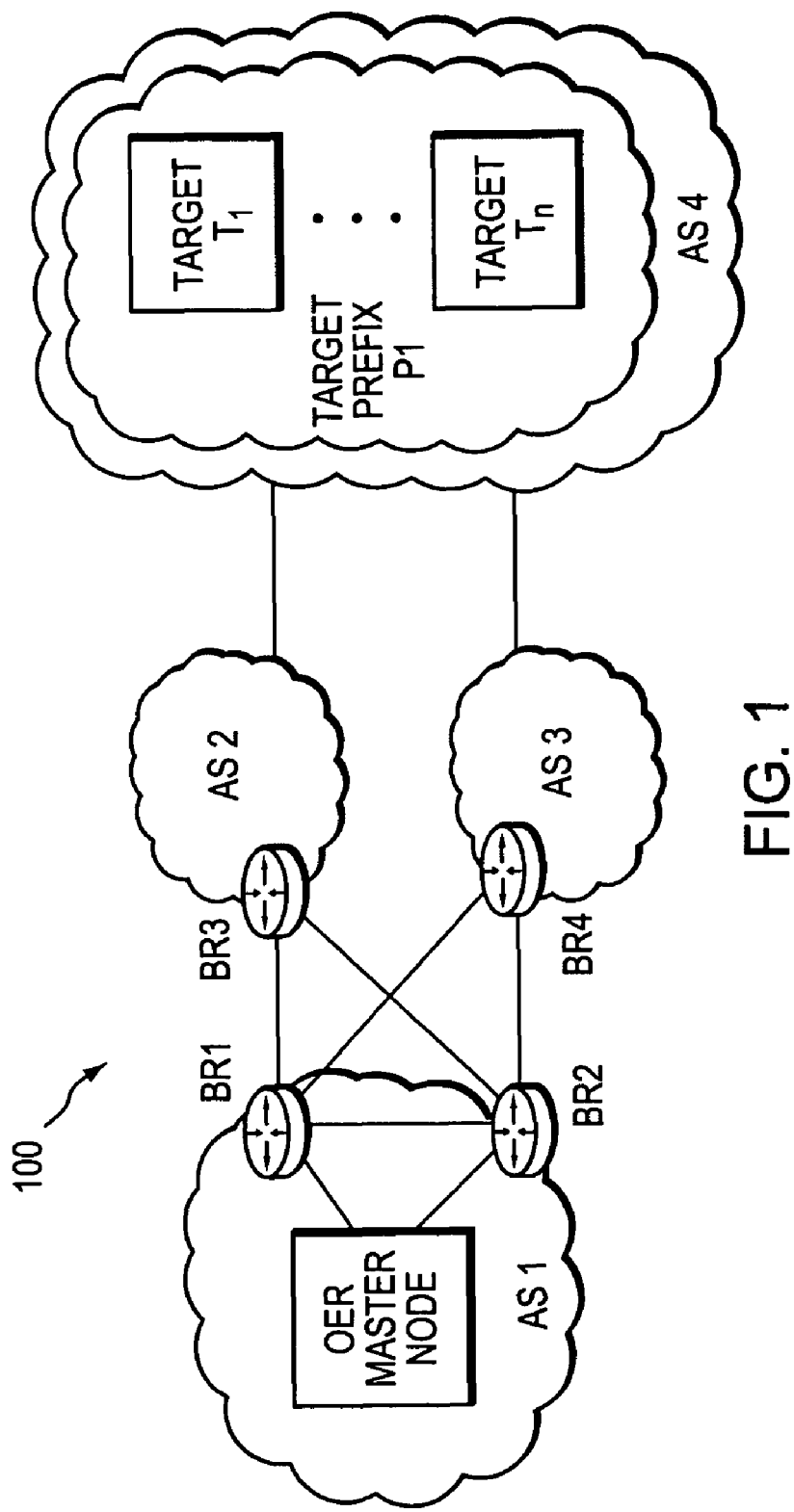
FIG. 1 is a schematic block diagram of an exemplary computer network that may be advantageously used with the present invention.

FIG. 1 is a schematic block diagram of an exemplary computer network 100 comprising a multi-homed autonomous system (AS) AS1 (e.g., an enterprise or content proeider network) interconnected to AS4 (e.g., a content consumer network) via a plurality of other ASes, AS2 and AS3 (e.g., ISPs). Although each of AS1-4 is illustratively an autonomous system, those skilled in the art will appreciate that the ASes may be configured as routing domains or other networks or subnetworks. AS1 comprises one or more network nodes, including a set of communicating border nodes (illustratively, edge or border routers, BRs) BR1 and BR2, through which client communications, such as data packet traffic, can pass into and out of the AS. For example, BR1 and BR2 permit communication from AS1 to AS2 (via BR3) and AS3 (via BR4). Routing operations at the border nodes BR1-2 may be managed by an optimized edge routing (OER) "Master" node, which may be connected to the border nodes by, e.g., point-to-point links or a local area network. AS4 includes a target prefix P1, containing one or more targets or hosts T1-Tn. These examples are merely representative. Those skilled in the art will understand that any number of routers and nodes may be used in the computer network and connected in a variety of ways, and that the view shown herein is for simplicity.

Data packets may be communicated by the ASes AS1-4 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing decisions within an AS may rely on predetermined "interior" gateway protocols (IGPs), such as conventional link-state or distance-vector protocols. In addition, data packets containing network topology information may be exchanged among the ASes using "external" gateway protocols, such as the Border Gateway Protocol (BGP).

Figure 2:
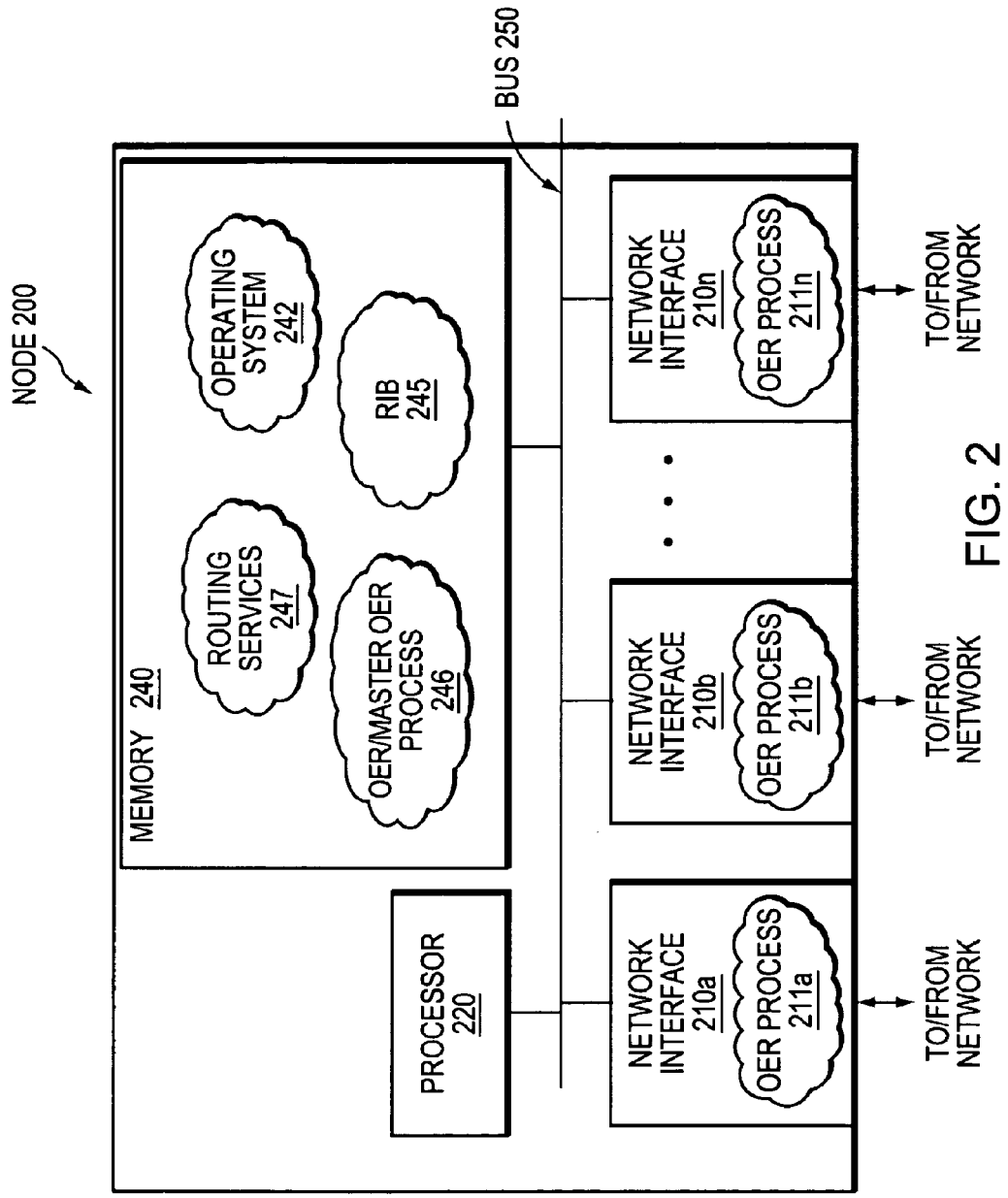
FIG. 2 is a schematic block diagram of an exemplary node that may be advantageously used with the present invention.

FIG. 2 is a schematic block diagram of an exemplary node 200 that may be advantageously used with the present invention as a border node (e.g., an edge router) or a master node. The node comprises a plurality of network interfaces 210a-n (e.g., line cards), a processor 220, and a memory 240 interconnected by a system bus 250. The network interfaces 210 contain the mechanical, electrical and signaling circuitry for communicating data over physical links coupled to the network 100, and also may be adapted to process the incoming and outgoing data, such as managing active probe packets in accordance with the present invention. The network interfaces may be further configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for virtual private network (VPN) access, known to those skilled in the art. Both physical network interfaces and virtual network interfaces (e.g., routes out of an edge router) are referred to generally herein as "exits."

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures. An operating system 242 (e.g., the Internetworking Operating System, or IOS™, of Cisco Systems, Inc.), portions of which are typically resident in memory 240 and executed by the processor, functionally organizes the router by, inter alia, invoking network operations in support of software processes and/or services executing on the router. These software processes and/or services include Routing Information Base (RIB) 245, OER/Master OER Process 246, and routing services 247. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as OSPF, IS-IS, IP, BGP, etc. These functions may be configured to manage a forwarding information database (not shown) containing, e.g., data used to make forwarding decisions. The RIB 245 maintains copies of routes (paths) provided by the routing protocols, such as IGP or BGP, in order to compute best paths/routes for installation into the routing table (not shown).

OER/Master OER Process 246 is illustratively employed by an OER node (e.g., border routers BR1-2) and an OER Master node (e.g., an OER Master router), respectively. The Master OER process 246 executing on the OER Master node communicates with border routers BR1-2 to request, among other things, the monitoring of a set of address prefixes. The OER processes 246 executing on the border routers monitor traffic at the edge of the AS1 and respond with, inter alia, network statistics corresponding to the monitored prefixes. Illustratively, instances of the OER process 246 execute on the network interfaces 210 as OER processes 211a-n configured to measure various types of network statistics acquired from monitored traffic. These statistics are then forwarded from the OER processes 211a-n to the OER process 246. The statistics may correspond to various traffic measurements, such as round-trip delay times, data throughput (i.e., the amount of data transferred or received), packet loss, reachability, etc. In general, the OER processes (notably, 246 and/or 211a-n) may measure any arbitrary traffic metric, including conventional cost-based and distance-based metrics. Further, the OER Process 246 and/or 211a-n may calculate statistical averages, variances, medians, etc. of a collection of traffic measurements.

The statistics from the OER Process 246 and/or 211a-n are then processed at the Master node in accordance with the Master OER process 246. More specifically, the Master OER process 246 analyzes the statistics and determines whether the distribution of traffic entering and/or leaving the AS1 can be optimized. If so, the Master OER process may redistribute traffic routed through the border nodes by, e.g., associating new BGP local-preference values with selected traffic or statically changing the routing table contents of the border nodes. In that sense, the Master OER process selects optimal exit links (OELs) to various destination prefixes. Notably, the Master OER process 246 may be distributed among a plurality of nodes, and thus need not reside in a single OER Master node. Also, it is not necessary for a single OER Master node to contain routing processes or routing tables, other than what is necessary for communication with the border nodes.

In order to obtain statistics in accordance with the present invention, the OER processes 246 actively probe the monitored prefix. Active probing relies on probe packets to measure various parameters associated with accessing the monitored prefix from an originating node (source). Probe packets are used by a border node to measure various parameters (e.g., jitter, delay, loss, reachability, etc.) associated with reaching the monitored prefix (e.g., a target prefix) in the network. Specifically, probe packets (requests) are generated by the border node, generally upon a request from the OER Master node, and transferred to a target node associated with the target prefix. The target node acquires each probe packet, and returns a response (reply) to the border node, such as by, e.g., modifying and returning the probe packet, returning a newly-generated response packet, or including the desired response information in a modified conventional return message (e.g., an ACK message). The border node then uses the returned probe packets to measure the various parameters associated with reaching the target prefix, and returns the results to the OER Master node.

For instance, assume that border node BR1 in AS1 measures round-trip packet delay times for traffic sent to target T1 in AS4, such as by measuring latencies of establishing a TCP session. The OER processes 246 and/or 211a-n of BR1 measure the latency between sending a TCP synchronize-sequence-number (SYN) packet to T1 and receiving a corresponding acknowledgement (ACK) packet. Alternatively, the OER processes may employ other techniques for measuring the round-trip delay times, such as issuing conventional "echo" packets (or "ping" packets). Those skilled in the art will understand that the present invention may be used with a number of protocols, such as ICMP, UDP, TCP, RTP, HTTP, etc. Notably, echo request and reply messages (echo packets) from the various protocols are described generally herein as probe packets. Moreover, it may be desirable to control the rate at which the probe packets are sent to the targets to thereby avoid refusal (filtering) by the ISP from what may appear to be a "denial of service" attack. As a result, the rate at which probe packets are sent may be limited to a very slow rate, e.g., one probe packet per minute.

Figure 3:
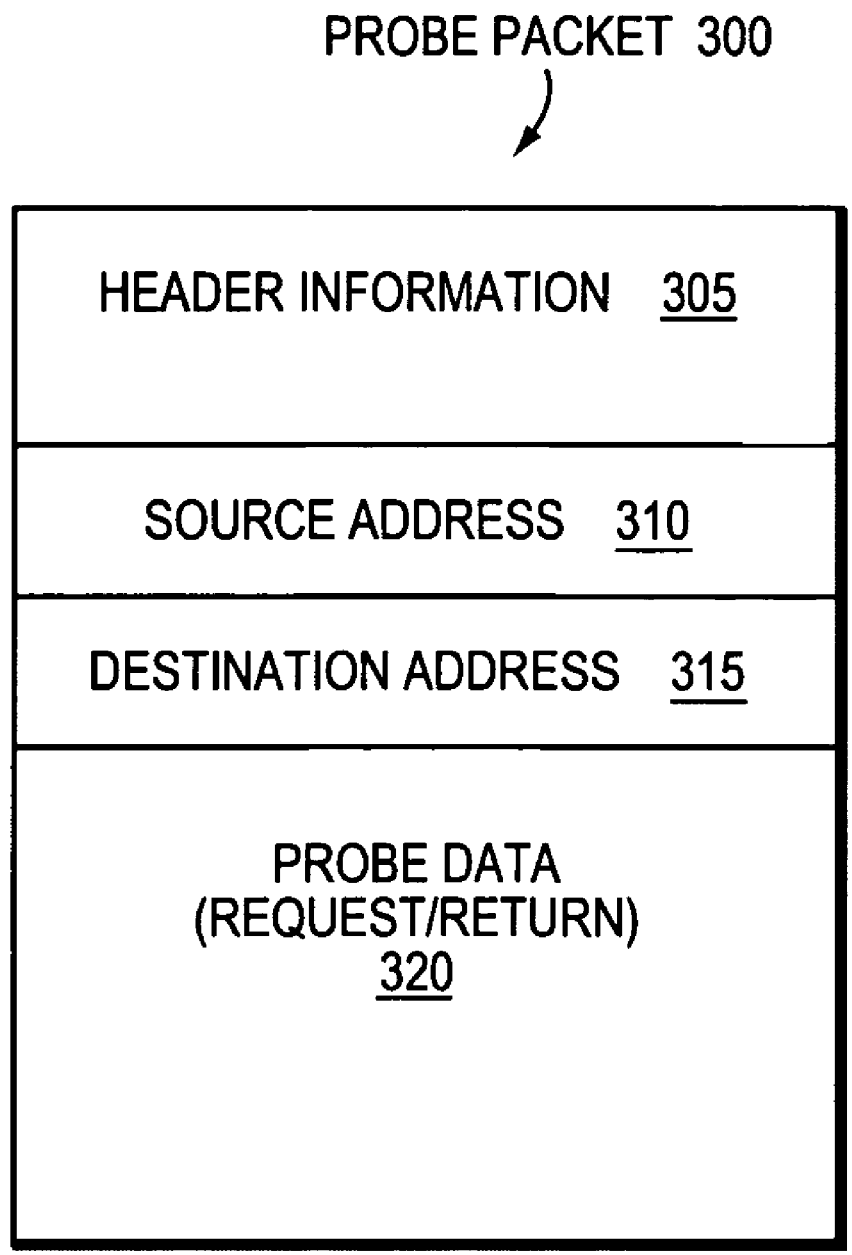
FIG. 3 is a schematic block diagram of an exemplary probe packet that may be used in accordance with the present invention.

FIG. 3 is a schematic block diagram of an exemplary probe packet 300 that may be used in accordance with the present invention. Probe packet 300 has a conventional header information field 305, such as an IP header. Source address field 310 contains the originating address of the probe packet, as described in detail herein. Destination address field 315 contains the address of the target to which the probe packet is destined. Illustratively, when the target responds to a probe packet (e.g., with a reply), the source address 310 and destination address 315 are switched (i.e., the source is the target, while the destination is the probe reply/response source.) Probe data field 320 contains the data pertinent to monitoring the parametric (performance) information, such as timestamps, probe identifiers, sequence numbers, etc. As further examples, probe packets for ICMP, UDP, and TCP are described in more detail in RFC 792, entitled *Internet Control Message Protocol*, published September 1981, RFC 862, entitled *Echo Protocol*, published May 1983, and RFC 1072, entitled *TCP Extensions for Long-Delay Paths*, published October 1988, respectively, the contents of each of which are hereby incorporated by reference in their entirety.

The border nodes send the probe packets to various targets that represent a given monitored prefix. Targets within a given prefix may either be configured targets or learned targets. A configured target may be manually configured by a system administrator or customer at the OER Master node. An example of a configured target may be where an administrator has an agreement with the target in the prefix, e.g., such as a target using UDP. Typically, there need not be a limit on the number of configured targets for a prefix. Each configured target is assumed to be usable, such as where the agreement between networks (ASes) ensures that a valid response will be returned.

A learned target, on the other hand, is a target that may be learned by monitoring traffic at the exits. For instance, a learned target can be determined by monitoring traffic that a data connection has been made from an exit to a particular node in the monitored prefix, (e.g., by detecting a TCP connect). From this information, a list can be created of nodes within the prefix, such as T1-Tn. Notably, the target need not be located beyond an adjacent domain, and could be, e.g., located in AS2. Further, these nodes may be categorized into groups, such as those that have been used the most frequently, those that have the highest traffic throughput (bandwidth), or those with the highest delays. An exemplary software application that may be used to collect network statistics is NetFlow™ by Cisco Systems, Inc., which is described in more detail in the technical paper entitled *NetFlow Services Solutions Guide*, published September 2002, and is hereby incorporated by reference as though fully set forth herein. These learned nodes from the target prefix may then be used as the learned targets. Typically, although not necessarily, the most frequently used nodes or the nodes with the highest traffic throughput will be the most representative learned target node for a given prefix, such as a web server within the prefix. It may be desirable, however, to use configured targets prior to using learned targets. Techniques for learning address prefixes and collecting traffic statistics are described in commonly-owned copending U.S. patent application Ser. No. 10/980,550, entitled METHOD AND APPARATUS FOR AUTOMATICALLY OPTIMIZING ROUTING OPERATIONS AT THE EDGE OF A NETWORK, filed by Shah et al. on Nov. 3, 2004, the contents of which are hereby incorporated in its entirety. Also, a technique for managing targets is described in above-incorporated U.S. patent application Ser. No. 11/113,582, entitled ACTIVE PROBE TARGET MANAGEMENT.

The present invention is directed to a technique for efficiently sending probe packets from a source to a target in a destination prefix over two or more paths of a computer network. According to the novel technique, the source, e.g., configured for OER, sends probe packets (probes) over all available paths (exits) to the target in the destination prefix in order to select a preferred path based on received responses to the probes, e.g., according to one or more policies. Once the preferred path is selected, the source sends probes to that target only over the preferred path until a trigger occurs, such as, e.g., an out of policy (OOP) event, a policy change, or an optional timer-based trigger. Upon being triggered, the source again probes all paths to reselect the preferred path.

In accordance with the present invention, the source sends active probes over all available paths to the destination (target) prefix in order to monitor various parameters associated with reaching the destination prefix. Operationally, the Master OER process 246 (e.g., at an OER Master node) requests that a prefix be monitored with active probes from the border nodes. For example, the Master node requests that BR1 and BR2 generate probe packets to monitor a target prefix P1 (e.g., using targets T1-Tn) over all of their possible paths. BR1 (e.g., OER Process 246 of BR1) creates a first probe packet destined for P1, and configures the probe packet to use a first path from BR1 to BR3. BR1 then creates a second probe packet destined for P1 and configured to use a second path from is BR1 to BR3. Those skilled in the art will understand that while OER Process 246 may create separate probe packets for each exit, it may also create a single probe packet for all exits. For instance, the OER Process may transmit the single probe packet to a forwarding function of routing services 247 a number of times that matches the number of exits. When OER Process 246 transmits the probe packet for a particular exit to routing services 247, it instructs the routing services to use the alternate routing table associated with the particular exit to be forwarded as described above. BR1 continues this process until a probe packet is sent from all possible exits that may reach P1, and reports the results of the probe packets to the Master OER process 246 for processing. BR2 follows a similar process to BR1 in order to send probe packets to the target prefix P1. Notably, alternate routing tables (not shown) may be used as opposed to conventional routing tables for sending probes over all paths (exits) because conventional routing tables are configured to send traffic for a particular prefix over a single path. By using alternate routing tables, the border nodes can force probes out any or all exits to monitor the prefix. A technique for managing paths of the probe packets in the manner mentioned above is described in above-incorporated U.S. patent application Ser. No. 11/113,629, entitled ACTIVE PROBE PATH MANAGEMENT, which has been fully incorporated by reference.

Upon receiving the responses to the probe packets (or after a configurable timer expires, signifying the loss/dropping of the probe packet), the source may select the preferred path to reach the destination prefix based on the parametric information obtained and the policies to which the information is applied. For example, policies may include such parameters as the number of hops, round-trip delay times, packet loss within a threshold, etc. The preferred path, therefore, is the path having the best parameter (e.g., lowest number of hops, fastest round-trip delay, lowest packet loss, etc.) according to the desired (or prioritized) policy decision, as will be understood by those skilled in the art. Once the preferred path has been selected for communicating with the destination prefix, the source no longer sends probe packets over all paths, but instead only over the preferred path (e.g., using the conventional RIB 245 and routing table). The source may send the probe packets over the preferred path to the same set of targets for the destination target prefix P1 (e.g., targets T1-Tn) that were used while sending probe packets over all paths above. By sending probe packets over the preferred path, the source is able to update the parametric (quality) measurements of the preferred path to the destination prefix in order to determine whether the path is still within the policy guidelines. Notably, those skilled in the art will understand that multiple preferred paths may be selected, such as, e.g., for load balancing traffic to the destination prefix, establishing secondary or backup paths, or other uses known in the art. Accordingly, a "preferred path" as used herein may also indicate the existence/selection of multiple preferred paths.

The source continues to probe only the preferred path(s) until a trigger occurs that indicates a need/benefit to probe all paths and determine whether a better path exists. Example triggers include, inter alia, an Out-of-Policy (OOP) event, a policy change, and an optional timer-based trigger. For example, for an OOP event, assume that the preferred path was selected according to a particular reason or policy (e.g., fewest hops, lowest delay, packet loss within threshold, etc.). An OOP event occurs when the path no longer satisfies the reason for selecting the path (e.g., hop count increases, delay increases, packet loss increases, etc.). Because probe packets are sent over the preferred path, the source is aware of when a particular policy is no longer met. As another example, when the policy regarding the "best" path changes, such as through manual reconfiguration or dynamic adjustment of policies, the source is required to send probes over all paths to re-select the best path based on the changed policy. An optional timer may also be used as a trigger to alternate from sending probes over one path to sending probes over all paths. Because OOP events may occur infrequently or at great intervals of time, paths other than the preferred path may have substantially improved since the preferred path was selected. While only sending probes over the current preferred path, the source remains unaware of the better path. Expiration of the configurable periodic timer allows the source to probe all paths to determine whether the currently preferred path is still the best path according to policies.

Figure 4A:
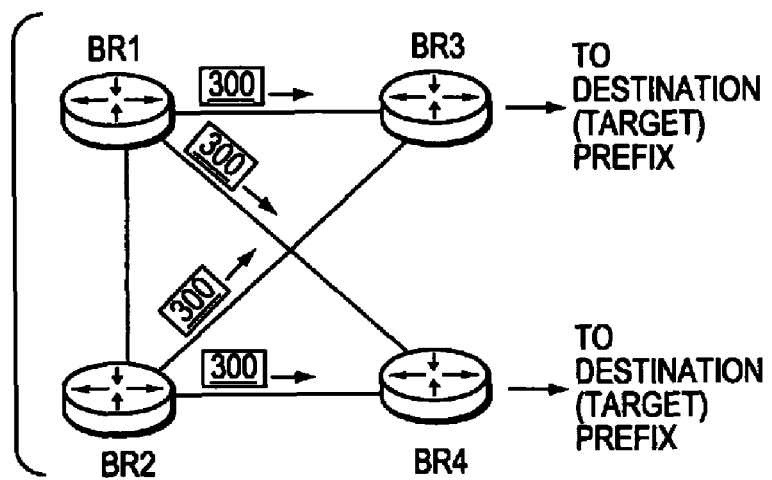
FIGS. 4A-4C are schematic block diagrams of portions of an exemplary computer network as in FIG. 1 illustrating an efficient sending of probe packets in accordance with the present invention.
Figure 4B:
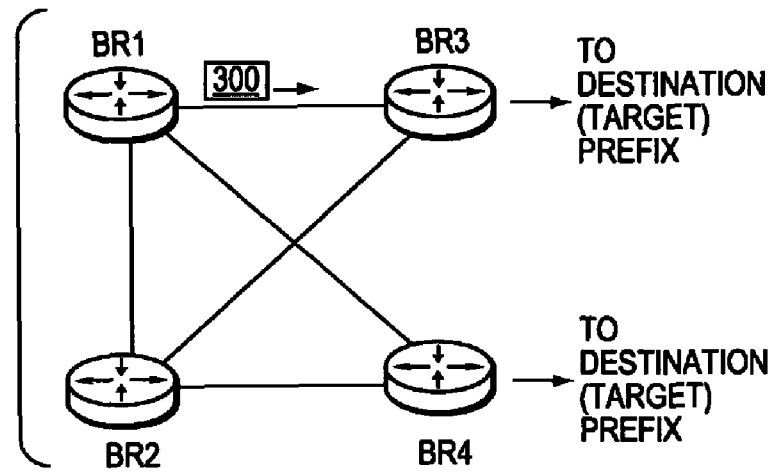
Figure 4C:
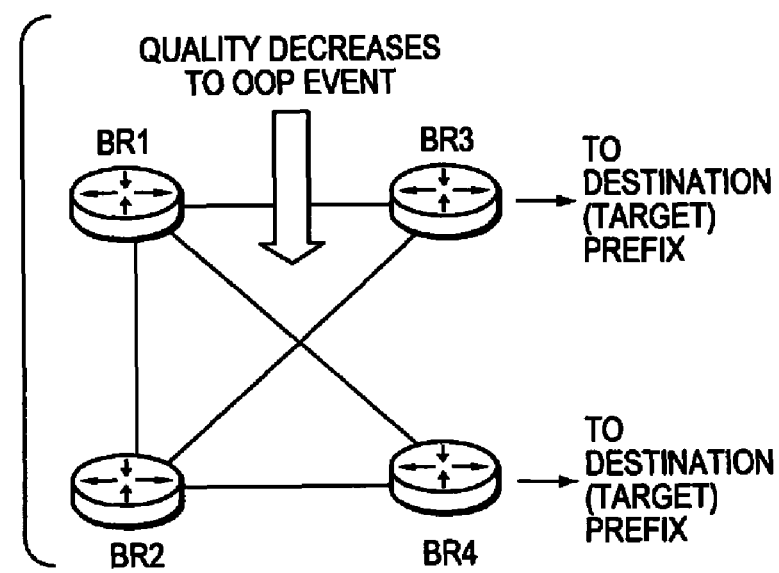

As an example, FIGS. 4A-4C are schematic block diagrams of portions of an exemplary computer network 100 as in FIG. 1 illustrating an efficient sending of probe packets 300 in accordance with the present invention. As described above, a source simultaneously sends probe packets 300 over all available paths to the destination prefix. As shown in FIG. 4A, each of the four paths (BR1-BR3, BR1-BR4, BR2-BR3, and BR2-BR4) receives a probe packet 300 in accordance with active probing methods described above. Once the responses are returned, the source selects a preferred path based on the returned parametric values, e.g., according to a particular policy. For example, if the source requested a path with the lowest round-trip delay time, the path over which the first probe response is returned is selected as the preferred path. In this example, assume that the probe packet 300 that was sent over the BR1-BR3 path had the shortest round-trip delay time, and that upon return of the response, BR1-BR3 is selected as the preferred path. Those skilled in the art will understand that the use of round-trip delay time is merely an example, and that other policies with other priorities may be used in accordance with the teachings of the present invention.

Once the preferred path is selected, the source continues to send probe packets 300 over only the preferred path, as shown in FIG. 4B, for the reasons described above. As shown in FIG. 4C, by monitoring the quality of the preferred path, the source determines that the quality of the path has decreased in response to an OOP event, such as an increase in round-trip delay time beyond a configurable threshold. Upon this trigger event, the source again sends probe packets 300 over all available links as shown in FIG. 4A to re-select the preferred path based on the returned responses. Notably, in the event that the original preferred path is again the path with the shortest round-trip delay time, no changes are made, and the original preferred path remains as such.

Figure 5:
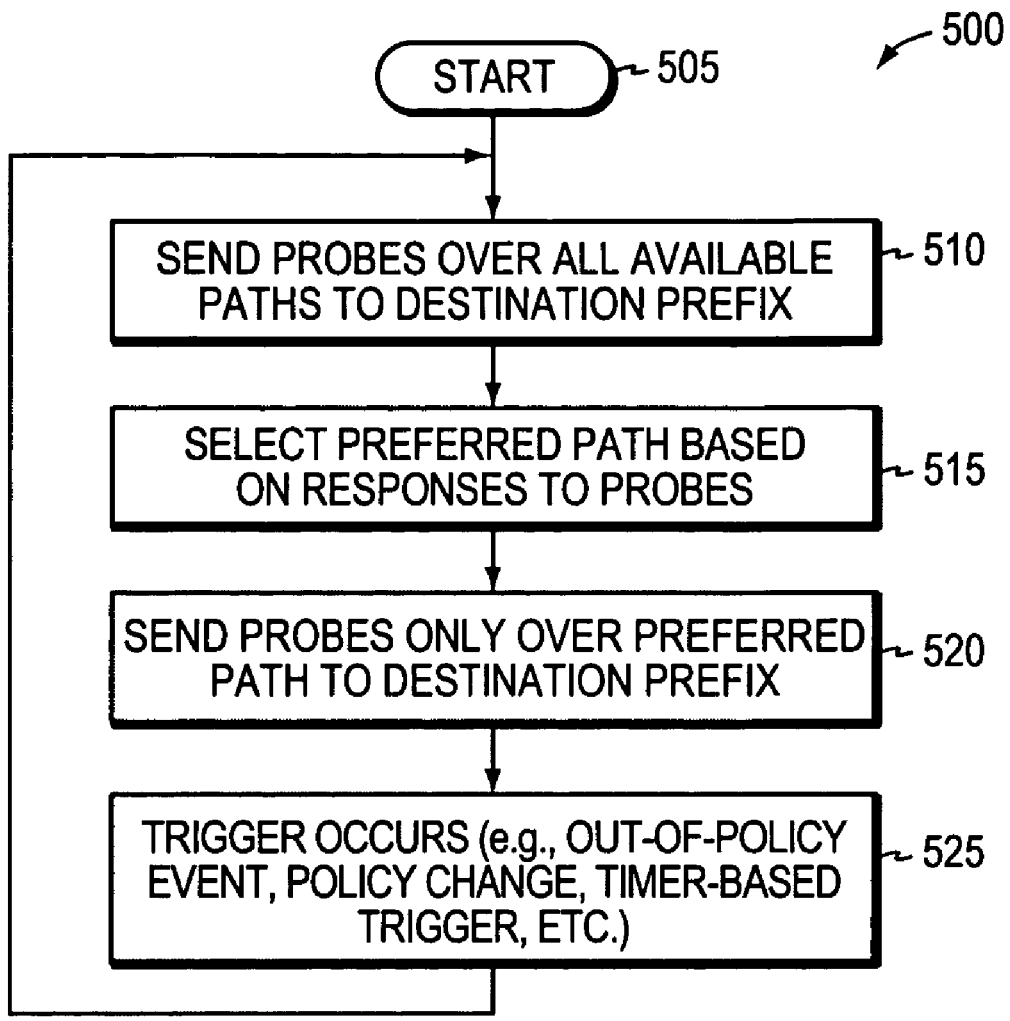
FIG. 5 is a flowchart illustrating a procedure for efficiently sending probe packets from a source to a destination over two or more paths in accordance with the present invention.

FIG. 5 is a flowchart illustrating a procedure for efficiently sending probe packets from a source to a destination over two or more paths in accordance with the present invention. The procedure 500 starts at step 505, and continues to step 510, where the source, e.g., the OER Master node, sends probes over all available paths to the destination (target) prefix. Based upon received responses to the probes, the source selects a preferred path to the destination prefix in step 515, e.g., BR1-BR3. Upon selection of the preferred path, the source only probes the preferred path (e.g., BR1-BR3) in step 520, until a trigger occurs in step 525. Notably, as described above, a trigger may be, inter alia, an OOP event, a policy change, or the expiration of a configurable timer. Once the trigger occurs in step 525, the procedure returns to step 510, where probes are again sent over all available paths to the destination prefix in step 510 to determine and re-select a preferred path. The procedure then continues accordingly.

Advantageously, the novel technique efficiently sends probe packets from a source to a destination over two or more paths of a computer network. By controlling the number of paths to receive probes, thus limiting the number of probes sent, the novel technique minimizes the total resource allocation of the source, target, and network (e.g., memory, processing, bandwidth, etc.). Also, by only sending probes over the preferred path during steady state (no triggers), the likelihood of responses and the quality (accuracy) of the responses are increased.

While there has been shown and described an illustrative embodiment that efficiently sends probe packets from a source to a destination over two or more paths of a computer network, it is to be understood that various other adaptations and modifications may be made within the spirit and scope of the present invention. For example, the invention has been shown and described herein as sending probes over all paths from a source to a destination prefix. However, the invention in its broader sense is not so limited, and may, in fact, send probes over a selected plurality of paths, e.g., as configured by a system administrator, certain policies, or other selective means, as will be understood by those skilled in the art. Also, where the above description indicates that the probes are sent over "paths", those skilled in the art will understand that the paths may be embodied as "exit interfaces," e.g., physical or virtual exit interfaces.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for efficiently sending probe packets from a source in a first autonomous system to a destination prefix in a second autonomous system over two or more paths, the method comprising:
    sending probe packets from the source in the first autonomous system to the destination prefix in the second autonomous system over each of the two or more paths that use different border routers of the first autonomous system to reach the destination prefix in the second autonomous system;
    selecting a preferred path to the destination prefix out of the two or more paths based on received responses to the probe packets;
    in response to the selecting a preferred path, sending probe packets from the source to the destination prefix only over the preferred path for a period of time until a trigger occurs;
    determining that the trigger has occurred; and
    in response to the trigger, again sending probe packets from the source to the destination prefix over each of the two or more paths.

2. The method as in claim 1, further comprising:
    after again sending probe packets from the source in the first autonomous system to the destination prefix in the second autonomous system over each of the two or more paths, repeating the steps of selecting the preferred path, and sending probe packets over the preferred path.

3. The method as in claim 1, further comprising:
    determining that the trigger has occurred based on an event selected from the group consisting of: an out of policy (OOP) event, a policy change, and expiration of a timer.

4. The method as in claim 1, further comprising:
    selecting the preferred path to the destination prefix in the second autonomous system out of the two or more paths based on received responses to the probe packets according to one or more policies.

5. The method as in claim 1, further comprising:
    sending the probe packets to one or more targets within the destination prefix in the second autonomous system.

6. The method as in claim 1, further comprising:
    selecting a plurality of preferred paths; and
    sending probe packets from the source in the first autonomous system to the destination prefix in the second autonomous system only over the plurality of preferred paths.

7. The method as in claim 1, wherein the two or more paths from the source in the first autonomous system to the destination prefix in the second autonomous system are a selected subset of all available paths from the source to the destination.

8. The method as in claim 1, wherein the source in the first autonomous system is configured for Optimized Edge Routing (OER).

9. An apparatus for efficiently sending probe packets from a source in a first autonomous system to a destination prefix in a second autonomous system over two or more paths, the apparatus comprising:
    means for sending probe packets from the source in the first autonomous system to the destination prefix in the second autonomous system over each of the two or more paths that use different border routers of the first autonomous system to reach the destination prefix in the second autonomous system;
    means for selecting a preferred path to the destination prefix out of the two or more paths based on received responses to the probe packets;
    means for sending probe packets from the source to the destination prefix only over the preferred path in response to selection of the preferred path for a period of time until a trigger occurs;
    means for determining that the trigger has occurred; and
    means for again sending probe packets from the source to the destination prefix over each of the two or more paths in response to the trigger.

10. A computer readable medium containing executable program instructions for efficiently sending probe packets from a source in a first autonomous system to a destination prefix in a second autonomous system over two or more paths, the executable program instructions comprising program instructions for:
    sending probe packets from the source in the first autonomous system to the destination prefix in the second autonomous system over each of the two or more paths that use different border routers of the first autonomous system to reach the destination prefix in the second autonomous system;
    selecting a preferred path to the destination prefix out of the two or more paths based on received responses to the probe packets;
    in response to the selecting a preferred path, sending probe packets from the source to the destination prefix only over the preferred path for a period of time until a trigger occurs;
    determining that the trigger has occurred; and
    in response to the trigger, again sending probe packets from the source to the destination prefix over each of the two or more paths.

11. The computer readable medium as in claim 10, the executable program instructions further comprising program instructions for:
    after again sending probe packets from the source to the destination prefix over each of the two or more paths, repeating the steps of selecting the preferred path, and sending probe packets over the preferred path.

12. A system for efficiently sending probe packets over two or more paths, the system comprising:
- a source in a first autonomous system configured to send probe packets over each of the two or more paths that use different border routers of the first autonomous system; and
- a destination prefix in a second autonomous system configured to receive the probe packets over the two or more paths and to return responses to the probe packets over the two or more paths;
- wherein the source in the first autonomous system is further configured to select a preferred path to the destination prefix in the second autonomous system out of the two or more paths based on received responses to the probe packets, in response to selection of the preferred path, send probe packets to the destination prefix only over the preferred path for a period of time until a trigger occurs, determine that the trigger has occurred, and in response to the trigger, again send probe packets from the source to the destination prefix over each of the two or more paths.

13. The system as in claim 12, wherein the source in the first autonomous system is further configured to, after again sending probe packets to the destination prefix over each of the two or more paths, select the preferred path, and send probe packets over only the preferred path.

14. A source node in a first autonomous system for efficiently sending probe packets to a destination prefix in a second autonomous system over two or more paths, the node comprising:
- one or more network interfaces to send probe packets to the destination prefix in the second autonomous system over the two or more paths that use different border routers of the first autonomous system to reach the destination prefix in the second autonomous system;
- a processor coupled to the one or more network interfaces and adapted to execute software processes; and
- a memory adapted to store an Optimized Edge Routing (OER) process executable by the processor, the OER process configured to i) send probe packets to the destination prefix in the second autonomous system over each of the two or more paths, ii) select a preferred path to the destination prefix out of the two or more paths based on received responses to the probe packets, iii) in response to selection of the preferred path, send probe packets from the source in the first autonomous system to the destination prefix in the second autonomous system only over the preferred path for a period of time until a trigger occurs, iv) determine that the trigger has occurred, and v) in response to the trigger, again send probe packets from the source to the destination prefix over each of the two or more paths.

15. The node as in claim 14, wherein the OER process is further configured to, after again sending probe packets from the source to the destination prefix over each of the two or more paths, select the preferred path, and send probe packets only over the preferred path.

16. A method comprising:
- sending probe packets from a source node in a first autonomous system to a destination prefix in a second autonomous system over each of two or more available paths that use different border routers of the first autonomous system to reach the destination prefix in the second autonomous system;
- selecting a preferred path to the destination prefix out of the two or more available paths based on received responses to the probe packets;
- once the preferred path is selected, entering a steady state, and during the steady state sending probe packets from the source to the destination prefix only over the preferred path, and not over other available paths to the destination prefix;
- subsequently, determining that a trigger has occurred; and
- in response to the trigger, again sending probe packets from the source to the destination prefix over each of the two or more available paths to the destination prefix in the second autonomous system.

17. The method of claim 16 wherein the preferred path is selected according to a particular policy and the trigger is occurrence of an out of policy (OOP) event where the preferred path no longer satisfies the particular policy.

18. The method of claim 16 wherein the preferred path is selected according to a particular policy and the trigger is occurrence of a change in the particular policy.

19. The method of claim 16 wherein the trigger is expiration of a timer.

20. A method comprising:
- sending probe packets from a source in a first autonomous system to a destination prefix in a second autonomous system over each of the two or more paths to reach the destination prefix in the second autonomous system;
- based on received responses to the probe packets, selecting a preferred path to the destination prefix that satisfies a particular policy from among the two or more paths;
- once the preferred path has been selected, no longer sending probe packets over each of the two or more paths, and instead sending probe packets from the source to the destination prefix only over the preferred path;
- subsequently, determining that the preferred path no longer satisfies the particular policy; and
- in response to determining that the preferred path no longer satisfies the particular policy, no longer sending probe packets from the source to the is destination prefix only over the preferred path, and instead sending probe packets from the source to the destination prefix over each of the two or more paths.

21. A method comprising:
- sending probe packets from a source in a first autonomous system to a destination prefix in a second autonomous system over each of the two or more paths to reach the destination prefix in the second autonomous system;
- selecting a preferred path to the destination prefix out of the two or more paths based on received responses to the probe packets;
- once the preferred path has been selected, no longer sending probe packets over each of the two or more paths, and instead sending probe packets from the source to the destination prefix only over the preferred path;
- subsequently, determining that a timer has expired; and
- in response to timer having expired, no longer sending probe packets from the source to the destination prefix only over the preferred path, and instead sending probe packets from the source to the destination prefix over each of the two or more paths.

\* \* \* \* \*

UNITED STATES PATENT AND TRADEMARK OFFICE
CERTIFICATE OF CORRECTION

PATENT NO.         : 8,072,901 B1
APPLICATION NO.    : 11/239595
DATED              : December 6, 2011
INVENTOR(S)        : Blair et al.

Page 1 of 1

It is certified that error appears in the above-identified patent and that said Letters Patent is hereby corrected as shown below:

Col. 1, line 54: "typically coupled ~~is~~ together by conventional "intradomain""

Col. 4, line 63: "system (AS) AS1 (e.g., an enterprise or content ~~proeider~~ provider"

Signed and Sealed this
Seventeenth Day of April, 2012

David J. Kappos
*Director of the United States Patent and Trademark Office*